H. W. SAUNDERS.
VALVE CAP.
APPLICATION FILED JULY 28, 1920.
1,357,906.
Patented Nov. 2, 1920.
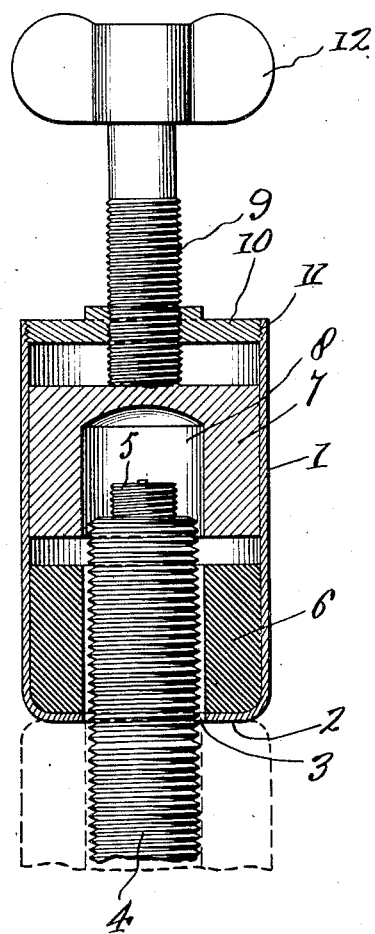
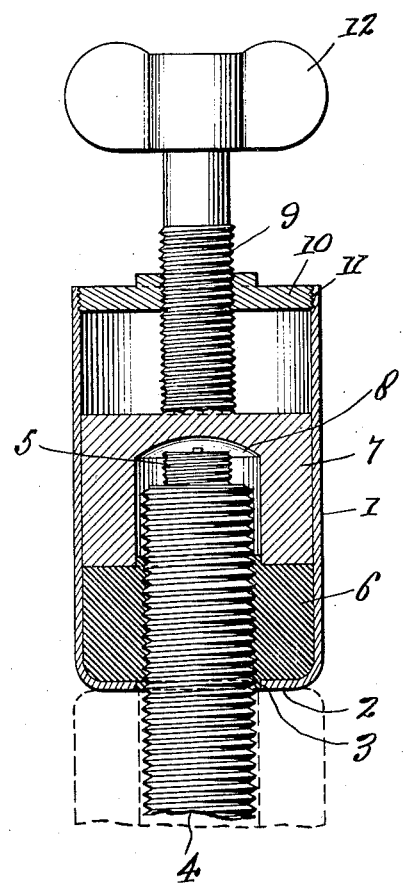
Inventor
H. W. Saunders
by Wilkinson & Fiusta
Attorneys.

UNITED STATES PATENT OFFICE.

HARRY W. SAUNDERS, OF CHARLOTTE, NORTH CAROLINA.

VALVE-CAP.

1,357,906.    Specification of Letters Patent.    Patented Nov. 2, 1920.

Application filed July 28, 1920. Serial No. 399,526.

*To all whom it may concern:*

Be it known that I, HARRY W. SAUNDERS, a citizen of the United States, residing at Charlotte, in the county of Mecklenburg and State of North Carolina, have invented certain new and useful Improvements in Valve-Caps; and I do hereby declare the following to be a full, clear, and exact description of the invention, such as will enable others skilled in the art to which it appertains to make and use the same.

The present invention relates to improvements in valve caps, and has for an object to provide an improved cap for the valve stems of the inner tubes of automobile pneumatic tires that may be readily applied and removed, and when in place will effectually prevent the escape of air.

Another object of the invention is to provide a device that will dispense with the usual valve cap and dust cap, and which will furnish a unitary device combining both of the functions of these devices.

A further object of the invention resides in providing a simple and inexpensive cap of the character above described which will occupy a small space and will be for all purposes substantially leak proof.

The invention will be more fully understood after reference to the accompanying drawings, in which like parts are indicated by similar reference symbols throughout the several views, and in which :—

Figure 1 is a longitudinal sectional view through an improved valve cap constructed in accordance with the present invention and shown in an initial position over the valve stem; and Fig. 2 is a similar view, showing the device in the final position.

Referring more particularly to the drawings, the improved device comprises a cylinder 1, of brass or other suitable metal, or appropriate material, being bent over at one of its ends to provide a head 2 in which is made an opening 3 to receive the exteriorly threaded customary valve stem 4.

In accordance with the usual practice a valve cap is threaded upon the reduced upper end 5 of the valve stem, and an additional dust cap is threaded upon the main body portion of the stem 4. These two parts now found necessary are dispensed with according to the present device, and the cylinder 1 is placed directly over the valve stem 4 in the manner shown in the drawings.

Within the cylinder 1 is a rubber or other compressible or elastic block or gasket 6, having one of its ends resting against the head 2 of the cylinder. Above the gasket 6 is a plunger 7 adapted to reciprocate in the cylinder 1, and having a hollow central portion 8 adapted to receive the outer end of the valve stem 4. The plunger 7 is formed with a screw-threaded shank 9, having threaded engagement with a centrally threaded perforation in a head or nut 10, threaded as indicated at 11 in the upper end of the cylinder 1. The shank 9 carries a winged portion 12 to permit engagement by the hand of the operator.

In use the device in the condition shown in Fig. 1 is inserted over the flange stem 4 and the plunger 7 is thereupon caused to descend into contact with the gasket 6. This is done by rotating the shank 9 which causes it to feed longitudinally through the nut or head 10. After the plunger 7 comes into contact with the upper end of the gasket 6 it will start to compress the gasket, which is restrained at its lower end by the head 2. The gasket will therefore be confined in all directions except toward the valve stem 4, so that as a result of the compression said gasket will enter between the threaded outer wall of the valve stem and will effectually seal the same. Any air escaping from the valve stem will be retained in the chamber 8 of the plunger and will be prevented from finding egress to the outside atmosphere.

The reverse rotation of the winged portion 12 will cause the plunger to retire away from the gasket 6, and by reason of its inherent stress the gasket will return to its normal condition shown in Fig. 1. The improved valve cap may thereupon be removed.

It will be appreciated from the foregoing that I have provided a simple and compact valve cap which will be for all purposes substantially leak proof, and which will dispense with the usual valve cap and dust cap now employed.

It will be obvious that various modifications might be made in the herein described apparatus, and in the construction, combination and arrangement of parts which could be used without departing from the spirit of my invention; and I do not mean to limit the invention to such details except as particularly set forth in the claims.

Having thus described my invention what I claim and desire to secure by Letters Patent of the United States is:—

1. An improved valve cap comprising a cylinder having a perforated head at one end, a compressible gasket within the cylinder engaging said head, and a movable plunger adapted to come in contact with the opposite end of the gasket and to compress the same, substantially as described.

2. An improved valve cap comprising a cylinder having a head formed in one piece with one end thereof, said head having an opening to receive a valve stem, a rubber gasket placed in said cylinder and having one end engaged with said head, said gasket having an opening therethrough and adapted to be extended into the threads of the valve stem, a reciprocating plunger in the cylinder adapted to come in contact with the opposite end of said gasket to compress the same, a screw-threaded shank on said plunger, and a head on the other end of the cylinder through which said shank may be moved axially when rotated, substantially as described.

3. An improved valve cap comprising a cylinder having a head at one end provided with an opening to receive a valve stem, a compressible and expansible gasket within the cylinder bearing at one end against said head and having an opening therethrough to normally freely receive said valve stem, a plunger in the cylinder having a hollow central portion to receive the outer end of the valve stem and adapted to come into contact with the other end of said gasket, a threaded shank formed with said plunger, a winged portion on the outer end of said shank, and a head threaded in the other end of said cylinder and having an interiorly threaded opening to receive the threads on said shank, substantially as described.

HARRY W. SAUNDERS.